United States Patent

[11] 3,630,365

[72] Inventors David D. Woodbridge
Eau Gallie;
Thomas A. Nevin, Indian Harbor Beach;
William R. Garrett, Melbourne; Leland A. Mann, Eau Gallie, all of Fla.
[21] Appl. No. 839,136
[22] Filed June 11, 1969
[45] Patented Dec. 28, 1971
[73] Assignee Energy Systems, Inc.
Melbourne, Fla.

[54] TRANSPORTABLE LIQUID WASTE TREATMENT PLANT
7 Claims, 1 Drawing Fig.

[52] U.S. Cl. .................................................. 210/152, 4/8, 210/241, 210/259
[51] Int. Cl. ........................................................ C02c 1/02
[50] Field of Search ............................................ 210/241, 259, 260, 64, 70, 152, 195; 4/8, 10, 115

[56] References Cited
UNITED STATES PATENTS

| | | | |
|---|---|---|---|
| 3,190,725 | 6/1965 | Van Den Berg .............. | 4/8 X |
| 3,220,706 | 11/1965 | Valdespino.................... | 210/15 X |
| 3,419,146 | 12/1968 | Koulovatos.................... | 210/152 X |
| 3,425,936 | 2/1969 | Culp et al. .................... | 210/196 X |
| 3,458,140 | 7/1969 | Schryver ........................ | 210/152 X |
| 3,487,937 | 1/1970 | Koulovatos.................... | 210/195 |
| 2,151,079 | 3/1939 | Bowen............................ | 210/259 X |
| 3,335,865 | 8/1967 | Cawley et al. ................. | 210/260 X |
| 3,356,609 | 12/1967 | Bruemmer...................... | 210/64 X |
| 3,463,172 | 8/1969 | Naylor............................ | 210/241 X |
| 3,498,457 | 3/1970 | Gough............................ | 210/260 X |

OTHER REFERENCES

" Destruction of Microorganisms in Water, Sewage, and Sewage Sludge by Ionizing Radiations," by Lowe, Jr. et al., in Journal of American Water Works Association, 11/1956, pages 1363– 1372.

Primary Examiner—Michael Rogers
Attorney—Duckworth and Hobby

ABSTRACT: Transportable liquid waste treatment apparatus is adapted for movement from place to place and for temporary or permanent connection to a sewage system, or the like, for the treatment of sewage and other liquid waste. The basis apparatus has transportable means for converting and separating solids from the liquid waste and for irradiating the remaining fluid with a gamma radiation source prior to discharging the irradiated effluent.

PATENTED DEC 28 1971
3,630,365
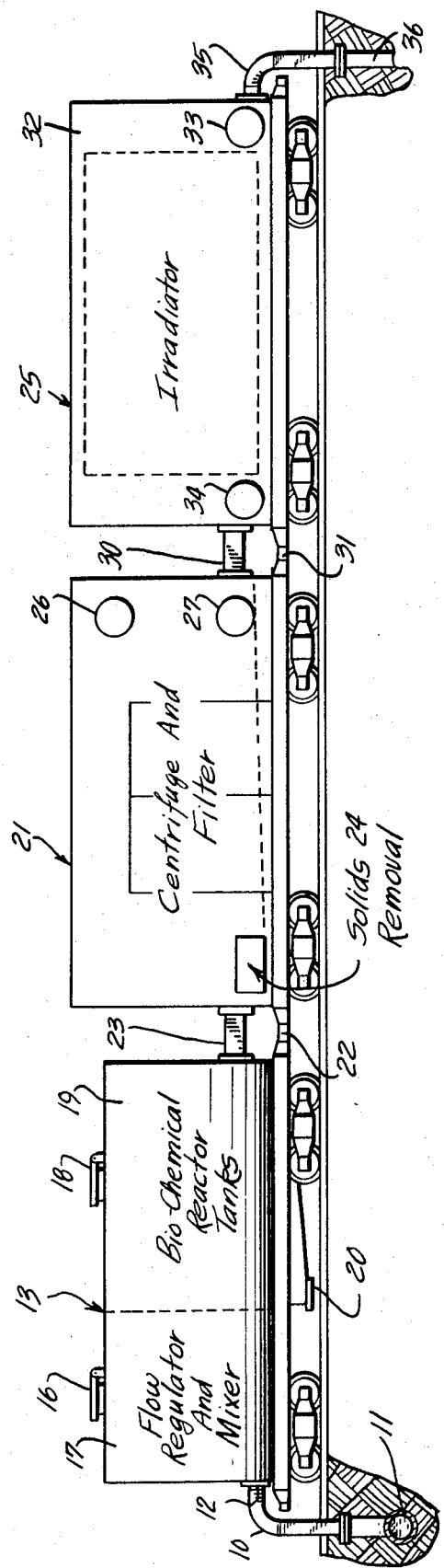
David D. Woodbridge
Thomas A. Nevin
William R. Garrett
Leland A. Mann
INVENTORS
BY Duckworth & Hobby
Attorney

TRANSPORTABLE LIQUID WASTE TREATMENT PLANT

BACKGROUND OF THE INVENTION

1. Field of the Invention

The present invention relates to liquid waste disposal and more particularly to a transportable sewage disposal apparatus in which a sewage treatment plant is adapted to be transported from place to place for use in emergencies or while a permanent sewage treatment installation is being built or rebuilt. The rapid growth of population in recent years coupled with the inadequate sewage disposal systems in most areas of the country have resulted in a substantial increase in the pollution of the water in the country. In addition to the direct pollution by untreated and partially treated sewage being dumped into bodies and streams of water, additional pollution results from the nutrients such as soluble nitrates and phosphates in the effluent sewage entering a body of water such as a lake or river and producing an overgrowth of weeks and undesirable blooms in unicellular algae. This, in turn, results in depriving animal and vegetable life of oxygen and varying the biological oxygen demands (BOD) in the water. Increasing attention has been given to the pollution of water from sewage and the like because of the importance of the quality of the water supply to community water systems. Large amounts of water flow through liquid waste systems which water is not returned to the same water source, which results in additional depletion of sources of water for the water supply systems of surrounding communities. With the increased recognition of the sewage and waste disposal problems in relation to pollution, it has become increasingly desirable to have a transportable community waste treatment system which may be moved in on short notice to correct or supplement deficient waste treatment systems already in use or to be utilized in emergency situations such as one in which a temporary overload may be expected on a sewage system. In the past this has not been possible because waste treatment systems in use have utilized large areas, such as lagoons, or large settlement and digestion tanks and required large permanent facilities with primary and secondary type treatments so that for any sizable community it would be impractical and almost impossible to have a conventional treatment facility which could provide any reasonable degree of treatment for the sewage and still remain transportable.

2. Description of the Prior Art

In the past many sewage disposal systems have been suggested and utilized for community sewage treatment. These usually consisted of primary treatment for the removal of solids, followed by secondary treatment to further remove and change the form of dissolved and colloidal organic matter for the reduction of odor and other nuisances. These prior art community sewage systems required large permanent installations, and have had varying degrees of success in preventing pollution of water sources. In addition to the usual type of permanent community sewage treatment plants there have been suggested many advanced waste treatment processes especially for use in secondary treatment of the sewage effluent and these include such things as: passing the effluent over activated charcoal, ammonia stripping or biological denitrification for the removal of nitrates and biological phosphate removal. However, these advanced systems are usually tied in with a primary treatment plant of some type and require large facilities of their own just for the secondary treatment of the sewage effluent. In addition, typically, several of these advanced systems would be required to be combined — for instance, to remove the important nutrients of nitrates and phosphates which are in soluble form in the liquid and are responsible for a great deal of the secondary or indirect pollution of water sources.

Finally, it has been suggested to provide portable enclosed chemical toilets, or the like, for placement on construction sites, or in places where large crowds are expected for outdoor events. These, however, are of no consequence to the present invention, since they are single units which require being pumped out at regular intervals, and provide no means for final disposal.

SUMMARY OF THE PRESENT INVENTION

The present system is a transportable liquid waste treatment plant which may be built in the form of railroad cars for movement over railroad track systems, or which may also be built into barges or ships for movement over canals, waterways, lakes, and the like, but which could be adapted to be hauled over the highways in a series of trucks and may be readily connected into a community sewage system, or the like, for treatment of sewage on a long or short term basis. For instance, in an emergency, when a sewage system plant has been damaged or destroyed, it would be desirable to have a transportable sewage treatment system to move in on short notice for treating the community's sewage, or it may be desirable to have a transportable system which may be easily connected and disconnected to a community sewage system while a new sewage treatment plant is being built, or while an old sewage treatment plant is being rebuilt. Input means and connections are provided to receive liquid waste from a community sewage system or from industrial facilities, or the like, and will generally be provided with a pump to pump the waste into the treatment plant. THe liquid waste is received first into a large transportable tank, or the like, in which one portion is separated, and provides mixing of the liquid waste to form a more homogeneous mixture of the solids and the liquid constituents in the waste. This mixing portion of the tank is also used as a flow regulator to regulate the flow of the waste through the treatment system. It might also be desirable at this point to provide screening and grit removal for the removal of large pieces of wood and other items which may have entered the sewer lines at some point and gritty materials that would damage pumps by their abrasive action.

In one embodiment of the present invention, the mixed sewage then enters a biological reactor tank which may be a part of the same tank car as the mixer and flow regulator. These tanks are charged with specific microbiological cultures such as selected yeast or selected types of bacteria for conversion and digestion of the sewage. These tanks could of course be chemostats or bactogens for removal of desired materials. The waste next passes into a unit for separating solids from the remaining fluid which unit may be for instance a type of centrifuge, or the like. The separated concentrated solids are then removed from the system and may be utilized for soil enrichment, in the manufacture of fertilizers or may be used as raw materials for the manufacture of other products or may be incinerated. Significantly, it may be desirable to precipitate the soluble nitrates and phosphates from the liquid sewage just prior to the removal of solids so that the larger proportion of formerly soluble nitrates and phosphates will be solidified and remain in the sludge and be removed from the system. This also has the advantage of enriching the sludge for soil enrichment utilization or for ammonia manufacture. The separated effluent may be filtered at this point and the liquid passed through a gamma radiation irradiator which is installed in a properly shielded transportable unit to prevent damage to individuals from radiation. It has been found that the irradiation breaks down a substantial portion of the detergents and other chemical chain structures, and bacteria and viruses in the fluid which, in combination with the previous removal of nitrates and phosphates, causes the waste leaving the system through the output to be substantially reduced in the primary nutrients that cause secondary pollution in the streams and bodies of water that it may then reenter. After irradiation, it may be desirable to again filter the effluent since the irradiator will have killed large amounts of bacteria, and the like, which it may be desirable to filter out. In addition, the transportable filter and irradiator have been provided with backwashing means so that they may be cleaned without any requirements for persons entering the system and without interfering with its operation except for short periods of time.

BRIEF DESCRIPTION OF THE DRAWING

Other objects, features and advantages of this invention will be apparent from a study of the written description and of the drawings in which the drawing shows an embodiment of the present invention.

DESCRIPTION OF THE PREFERRED EMBODIMENT

Referring to Drawing Figure, a transportable sewage treatment plant adapted for transportation over railroad lines is shown having an input line 10 connected to a sewer line 11 from a sewer system. The input line has coupling means 12 for coupling to the first transportable unit of the treatment plant. This unit will normally have a bar screen, or the like, to prevent blocks of wood, or other large pieces from entering the plant, and will usually require a pump to provide the necessary fluid pressure and flow for the operation of the plant. The first unit 13 is a tank-type railroad car having wheels 14 that ride on a track 15, with the tank having a first entrance 16 for entrance into the flow regulator and mixer 17 which will have means for mixing the liquid and solid constituents of the liquid waste entering the system into a more homogenized mixture. This may be done by any blending means placed in unit 17.

Flow regulators may be adapted to regulate the flow of the liquid waste through the plant and to prevent the system being reduced in efficiency by the flow passing too quickly through the system.

Tank car 13 has a second entrance 18 for entrance into a biological reactor tank 19 which is an open tank charged with predetermined microbiological agents for the digestion and other treatment of sewage for the conversion of solid and dissolved constituents into a more desirable form. This tank is provided with a removable door 20 for cleaning the digestion tank and removing accumulated material from the bottom of the tank. These tanks can be converted for use as chemostats or bactogens where continuous cultures of predetermined bacterial population are provided with desired medium including special nutrients for production and removal of desired materials. Special chemical treatment might also be desired for converting components of the waste or otherwise treating it with chemical additives.

It should be made clear at this point that a transportable sewage plant such as the present could be made without having digestion tanks and for certain uses this might be a desirable way for utilizing the system.

It should also be clear that while one tank is shown, it may be desirable to have more than one digestion tank without departing from the spirit and the scope of the present invention. These tanks can also be set up in the form of chemostats in which desirable materials could be formed and removed from the sewage for other uses. For instance, the removal of methane and ammonia can be economically accomplished by prior known methods without affecting the present system operation. Tank car 13 is connected to a second railway car 21 by coupler 22 and also has a flexible pipe means 23 connected between cars 13 and 21 for removal of the sewage from car 13 to car 21. This flexible connection 23 could remain fixedly attached between the cars during transportation but to prevent wear and tear it might be desirable to have an easily connectable pipe which can be connected and disconnected for movement of the system to a new location. Car 21 has side entrance doors for entering into the car and may be a standard railway car which has been converted to handle the separating means of the present invention which is used to separate the solid and liquid constituents of the waste being received from digestion tank 19. This separation means may be for instance a continuous sludge separator of a centrifugal type such as a filter drum-type centrifuge wherein a drum is perforated and rotated with the solid particles being retained at the inner wall of the drum and the liquid passing through the perforations for removal from the centrifuge. This type of centrifuge is made continuous acting by providing stationary scrapers and other means to continuously remove the solid material which may then be moved out of the railroad car by an auger, or the like. It will of course be understood that other types of sludge separators may also be used and that the removal of sludge from the liquid waste is, of course, done in the most economical and advantageous manner but at the same time it would not require removal of all of the solids from the effluent and that of course the soluble materials in the effluent would normally pass through with the effluent.

A door 24 is shown to illustrate the removal point of the sludge from the centrifuge located in the railroad car 21. The effluent would then pass through a filter, such as a sand filter prior to entering the next railroad car 25 housing an irradiator. Car 21 would desirably have connections 26 and 27 at each end of the filter located therein so that the filter which may be, for instance, a sand filter, can be backwashed in order to be cleaned without having to enter he car or the filter. It would require merely hooking a water line into connection 27 and under pressure pumping water through the filter backwards and out of a second pipe connected to the entrance portion of the filter 26 and thus clean the filter of accumulated filtered solids. The waste liquid then proceeds through a second flexible coupling 30 into railroad car 25 which is coupled at 31 to car 21 and as in the case of coupling 23 could be connected at all times in a fixed manner but would desirably be easily connected and disconnected to prevent additional wear during the movement of the system from one location to another.

It should be noted at this point that it may be desirable to have means for introducing a material such as a calcium salt into the liquid waste prior to its entering the centrifuge car 21 to precipitate the soluble phosphates so that they will be solidified and remain in the solids during the concentration in the centrifuge whereby the liquid effluent leaving the centrifuge will be substantially reduced in phosphate content. This is especially desirable where the solids sludge is to be used for soil enrichment rather than incinerated, since it would provide additional nutrients for the soil. As can be seen, the effluent entering the irradiator 25 has had substantial amount of the solids removed as well as other materials, and has been filtered as well as treated in the digestion tank or chemostats. The irradiator unit 25 will have specially shielded walls 32 to prevent the escape of radiation from the irradiator core and would normally have an entrance from the top of the car for ease of loading and unloading radioisotopes into and out of the core in the safest manner. Additionally, this car may be provided with connections 33 and 34 so that the irradiator can be cleaned by connecting pipes, for instance, to connection 33 and forcing water through the irradiator and out pipes connected to connection 34 without having to enter the system or be exposed to radiation. Valves would of course be provided to cut the system off from the entrance and exit to car 25. The core of the irradiator used in car 25 may desirably be similar to one described in copending patent application Ser. No. 799,578 filed Feb. 17, 1969, by two of the inventors of the present invention, and entitled RADIATION DEVICE, which radiation core is specially desirable for the treatment of liquid sewage effluent. This unit provides efficient utilization of gamma radiation sources, such as cobalt-60 or cesium-137. After the waste passes through the irradiator car 25, it leaves through exit 35 which of course should be flexible for connection to a pipe 36 which could deliver the treated effluent into a stream or body of water without polluting the water, or could direct the effluent back into the earth to resupply an aquifer, or the like, or could desirably be used in irrigation of crops and the like. It should be noted at this point that the nitrates and phosphates can be substantially converted to solids and the solids removed with the other solids and that the irradiator utilizing gamma radiation has been found to substantially break down the detergents in the effluent, thus removing primary constituents that produce pollution in most major sources of water. It might, however, be desirable not to remove the nitrates and phosphates out of the effluent if the effluent is to be used for irrigation of crops, trees, and the like, since the nutrients in this case would be desirable and would provide some of the elements of fertilization needed for the crops while at the same time providing a source of water for irrigation. It should also be noted at this point that depending upon the use of the particular plant, it might be desirable to have an additional car having additional filters for the effluent which filters would follow the irradiator to remove such things as the bacteria that had been killed by the irradiation, since the irradiation would result in an effluent sterilized with a very high degree of kill for the micro-organisms in the effluent and would also be responsible for breaking down other constituents of the effluent.

As can be readily seen, the present system is easily adaptable for adding or deleting units by the addition or deletion of specially made transportable units to meet special situations, such as a specialized type of industrial waste to be treated, or to provide additional treatment as may be desired without departing from the spirit and the scope of the present invention. It should also be clear to those skilled in the art that the present system provides a community waste treatment plant which cannot only be easily transported from place to place by rail, as desired, but which can be designed and built into barges or ships for transportation on canals and waterways, and the like, and could also be designed for overland transportation in specially built trucks.

The irradiator unit has been shown to be successful in breaking down certain other materials located in effluent, such as for instance some organic materials, and the present invention is not to be construed as limited to the particular forms disclosed herein, since these are to be regarded as illustrative rather than restrictive.

We claim:

1. A transportable liquid waste treatment plant comprising in combination:
   a. input means adapted to receive liquid waste, said liquid waste having liquid and solid constituents therein;
   b. transportable biological treatment tank means connected to said input means for treatment of said waste;
   c. transportable separation means connected to said biological treatment tank means for separating solids from said liquid waste, said transportable separation means having means for removing said solids therefrom;
   d. transportable gamma radiation irradiator means connected to said separation means for receiving and irradiating the effluent having solids removed therefrom with gamma radiation on a continuous flow basis;
   e. said transportable gamma radiation irradiating means having shielded walls surrounding an irradiator for shielding the gamma irradiation source;
   f. said transportable gamma radiation irradiator also having external connection for connecting a fluid source thereto for cleaning the irradiator without removal from said transportable gamma radiation irradiator means; and
   g. output means connected to said irradiator means for providing an output from said waste treatment plant, whereby a self-contained waste treatment system may be transported between locations and quickly set into operation.

2. The apparatus according to claim 1, but including mixing means located between said input means and said separation means for mixing said liquid waste being received into a more homogeneous mixture of the liquid and solid constituents of said waste.

3. The apparatus in accordance with claim 2, but including filter means connected between said separation means and said irradiator means and adapted to filter the effluent leaving said separation means.

4. The apparatus according to claim 3, in which said filter means has backwashing means adapted to connect a waterline thereto for backwashing the filter elements.

5. The apparatus according to claim 4, including pump means located in said input means for pumping said liquid waste to said treatment plant.

6. The waste treatment plant in accordance with claim 5 in which said plant is located in railroad cars for transportation over railroad tracks.

7. The apparatus in accordance with claim 5, in which said output means is connected to an irrigation system.

* * * * *